C. J. SIMONSON & T. FAGERVIK.
STEEL TIRE.
APPLICATION FILED JULY 23, 1910.

1,002,003.

Patented Aug. 29, 1911.

Inventor
Christian J. Simonson
Theodore Fagervik
By Victor J. Evans
Attorney

UNITED STATES PATENT OFFICE.

CHRISTIAN J. SIMONSON AND THEODORE FAGERVIK, OF MINNEAPOLIS, MINNESOTA.

STEEL TIRE.

1,002,003.   Specification of Letters Patent.   Patented Aug. 29, 1911.

Application filed July 23, 1910.   Serial No. 573,581.

*To all whom it may concern:*

Be it known that we, CHRISTIAN J. SIMONSON and THEODORE FAGERVIK, citizens of the United States, residing at Minneapolis, in the county of Hennepin and State of Minnesota, have invented new and useful Improvements in Steel Tires, of which the following is a specification.

This invention relates to improvements in wheels, and is primarily directed to resilient tires therefor, and the object of the invention is to provide a device of this character which is comparatively simple in construction, and which embodies a peculiar formation and arrangement of parts so as to render the tire sufficiently resilient and at the same time strong and durable, as will be hereinafter more fully described and claimed.

With the above, and other objects in view, which will appear as the description progresses, the invention resides in the novel construction and combination of parts hereinafter fully described and claimed.

In the accompanying drawings there has been illustrated a simple and preferred embodiment of the improvement, and in which drawings, Figure 1 is a side elevation of a wheel provided with the improved tire. Fig. 2 is a central longitudinal sectional view of the same. Fig. 3 is an enlarged transverse sectional view taken centrally through one of the spring members.

In the accompanying drawings the numeral 1 designates an ordinary wheel. This wheel 1 has its hub 2 provided with a plurality of radiating spokes whereby the felly 3 is connected with the wheel. Surrounding the outer face of the felly 3 is a metallic ring member or strap 4. This strap 4 has both of its ends offset and provided with threaded perforations, the said perforations being adapted for the reception of a threaded securing member 5. Secured to the strap member 4 at spaced intervals are bracket or supporting members 6, and the said bracket members are provided with both longitudinal and transverse openings designated by the numerals 7 and 8, the purposes of which will presently be set forth.

The strap 4 has both of its edges offset to provide arms 9 and 10, and each of the said arms is provided with suitable openings whereby vertically extending offsets 11 and 12 are connected therewith. These offsets 11 and 12 are adapted for the reception of cross sectional U-shaped members 13 and 14, both of the elements being adapted to serve as means for preventing the entrance of dust, dirt, mud or the like to the interior of the tire, which will be presently described. It is to be understood that while we have illustrated and described the strap 4 as having its ends removably secured to the members 11 and 12 it is within the scope of the invention to form the members 11 and 12 integral with the said strap 4 should it be desired.

By reference to Fig. 3 of the drawing it will be noted that the outer arms of the members 13 and 14 are of a greater length than the swinging arms of the said members, and these arms are connected with the shell 15 which forms the tire proper. The lower extremity of the shell 15 is flattened as at 16, and the said flattened portion is adapted for the reception of a tread member 17 which is preferably constructed of rubber or the like. The flattened tread portion 17 of the shell 15 has its inner face provided with a plurality of suitable bracket members 18, the same being arranged in series directly in alinement with the upper bracket member 6, and each of the said bracket members 18 is provided with longitudinal and transverse elongated openings 19 and 20. The transverse openings 20 provided within each of the brackets 18 are adapted for the reception of a cylindrical spring member 21, the same passing through the transverse opening 7 of the bracket 6. The longitudinal openings 8 and 19 of both the adjacent brackets 6 and 18 are adapted for the reception of a similar ring 22. By this arrangement, it will be noted that the rings 21 and 22 exert a resilient pressure between the tread 16 of the shell 15 and the felly 3 of the wheel 1, while at the same time the U-shaped members 13 and 14 playing upon the members 11 and 12 prevent the shell or tire from being entirely removed under any amount of pressure. It is to be further understood that the strap 4, shell 15 and protecting members 13 and 14 as well as the offsets 11 and 12 may be constructed in any number of parts if desired, and from the above description, taken in connection with the accompanying drawings, it will be noted that we have provided an extremely simple and thoroughly effective device for the purpose intended, and while we have illustrated and described the preferred embodiment of the improvement, as it now appears to us, minor details of construction, within the scope of the following claim, may be resorted to if desired.

Having thus fully described the invention, what we claim as new is:—

In a tire, including a felly and a shell forming a tread for the felly, of oppositely disposed bracket members, one positioned upon the felly and the other positioned upon the shell, each of said bracket members being provided with longitudinally and transversely arranged openings, said openings being each of a rectangular formation, flattened spring ring members engaging the corresponding transverse and longitudinal openings, substantially as and for the purpose set forth.

In testimony whereof we affix our signatures in presence of two witnesses.

CHRISTIAN J. SIMONSON.
THEODORE FAGERVIK.

Witnesses:
F. A. WAREHAM,
AMANDA WAREHAM.

Copies of this patent may be obtained for five cents each, by addressing the "Commissioner of Patents, Washington, D. C."